(12) United States Patent
Maddox et al.

(10) Patent No.: US 12,153,227 B2
(45) Date of Patent: Nov. 26, 2024

(54) LIGHT DISC MICROSCOPY FOR FLUORESCENCE MICROSCOPES

(71) Applicants: The University of North Carolina at Chapel Hill, Chapel Hill, NC (US); Mizar Imaging, LLC, Woods Hole, MA (US)

(72) Inventors: Paul Samuel Maddox, Chapel Hill, NC (US); Tanner Christian Fadero, Chapel Hill, NC (US); Joel Carter Smith, East Falmouth, MA (US)

(73) Assignees: THE UNIVERSITY OF NORTH CAROLINA AT CHAPEL HILL, Chapel Hill, NC (US); MIZAR IMAGING, LLC, Woods Hole, MA (US)

( * ) Notice: Subject to any disclaimer, the term of this patent is extended or adjusted under 35 U.S.C. 154(b) by 177 days.

(21) Appl. No.: 17/725,501

(22) Filed: Apr. 20, 2022

(65) Prior Publication Data
US 2022/0244560 A1    Aug. 4, 2022

Related U.S. Application Data

(63) Continuation-in-part of application No. 16/980,225, filed as application No. PCT/US2019/021839 on Mar. 12, 2019, now Pat. No. 11,314,074.
(Continued)

(51) Int. Cl.
*G01N 21/64*  (2006.01)
*G02B 21/02*  (2006.01)
(Continued)

(52) U.S. Cl.
CPC ......... *G02B 27/58* (2013.01); *G01N 21/6458* (2013.01); *G01N 21/6486* (2013.01);
(Continued)

(58) Field of Classification Search
CPC ........ G02B 27/58; G02B 21/02; G02B 21/08; G02B 21/0032; G02B 21/0076;
(Continued)

(56) References Cited

U.S. PATENT DOCUMENTS

| 4,199,686 A | 4/1980 | Brunsting et al. |
| 4,871,249 A | 10/1989 | Watson |

(Continued)

FOREIGN PATENT DOCUMENTS

| CA | 3035788 | 1/2023 |
| CN | 1621815 A | 6/2005 |

(Continued)

OTHER PUBLICATIONS

Notice of Allowance for Chinese Patent Application Serial No. 201980027377.7 (Jan. 16, 2024).
(Continued)

*Primary Examiner* — Kiho Kim
(74) *Attorney, Agent, or Firm* — Jenkins, Taylor & Hunt, P.A.

(57) ABSTRACT

Methods for imaging a sample using fluorescence microscopy, systems for imaging a sample using fluorescence microscopy, and illumination systems for fluorescence microscopes. In some examples, a method includes positioning the sample such that a plane of interest of the sample is coplanar with a focal plane of a detection objective of a microscope; positioning a mirror around the sample; directing a beam of annularly collimated excitation light on the mirror to focus a disc of light on the sample; and imaging the sample through the detection objective.

18 Claims, 9 Drawing Sheets

Related U.S. Application Data

(60) Provisional application No. 62/641,598, filed on Mar. 12, 2018.

(51) Int. Cl.
   *G02B 21/08* (2006.01)
   *G02B 27/58* (2006.01)

(52) U.S. Cl.
   CPC ............ *G02B 21/02* (2013.01); *G02B 21/08* (2013.01); *G01N 2021/6463* (2013.01)

(58) Field of Classification Search
   CPC ............... G02B 21/367; G02B 21/084; G01N 21/6458; G01N 21/6486; G01N 2021/6463
   See application file for complete search history.

(56) References Cited

U.S. PATENT DOCUMENTS

| | | | |
|---|---|---|---|
| 5,293,269 | A | 3/1994 | Burkhart et al. |
| 5,644,400 | A | 7/1997 | Mundt |
| 5,650,877 | A | 7/1997 | Phillips, Jr. et al. |
| 5,801,828 | A | 9/1998 | Collins |
| 6,088,097 | A | 7/2000 | Uhl |
| 6,819,411 | B1 | 11/2004 | Sharpe et al. |
| 7,166,838 | B1 | 1/2007 | Janik |
| 11,099,370 | B2 | 8/2021 | Maddox et al. |
| 11,262,570 | B2 | 3/2022 | Maddox et al. |
| 11,314,074 | B2 | 4/2022 | Maddox et al. |
| 2001/0028497 | A1 | 10/2001 | Uhl |
| 2001/0040717 | A1 | 11/2001 | Minoura et al. |
| 2003/0137725 | A1 | 7/2003 | Mueller et al. |
| 2005/0006585 | A1 | 1/2005 | Graham et al. |
| 2005/0111084 | A1 | 5/2005 | Mandella |
| 2005/0134841 | A1 | 6/2005 | Vacz-Iravani et al. |
| 2005/0174568 | A1 | 8/2005 | Vaez-Iravani et al. |
| 2006/0146343 | A1 | 7/2006 | Wadman |
| 2006/0239404 | A1 | 10/2006 | Udpa et al. |
| 2006/0290936 | A1 | 12/2006 | Imura et al. |
| 2007/0109633 | A1 | 5/2007 | Stelzer |
| 2007/0153368 | A1 | 7/2007 | Vucinic et al. |
| 2008/0030850 | A1* | 2/2008 | Wolleschensky .... G02B 21/006 359/389 |
| 2009/0195866 | A1 | 8/2009 | Kawaski et al. |
| 2009/0296087 | A1 | 12/2009 | Dyshkant et al. |
| 2010/0188957 | A1 | 7/2010 | Knittel et al. |
| 2010/0309566 | A1 | 12/2010 | DeWitt et al. |
| 2011/0300490 | A1 | 12/2011 | Rachet et al. |
| 2011/0310393 | A1 | 12/2011 | Smirnov et al. |
| 2012/0043476 | A1 | 2/2012 | Salmelainen |
| 2012/0293863 | A1 | 11/2012 | McMullen et al. |
| 2015/0098126 | A1 | 4/2015 | Keller et al. |
| 2015/0286042 | A1 | 10/2015 | Hilbert et al. |
| 2016/0048014 | A1 | 2/2016 | Knebel et al. |
| 2016/0123869 | A1 | 5/2016 | Messerschmidt |
| 2016/0139394 | A1 | 5/2016 | Taniguchi et al. |
| 2018/0052186 | A1 | 2/2018 | Su et al. |
| 2019/0196167 | A1 | 6/2019 | Maddox et al. |
| 2019/0219807 | A1 | 7/2019 | Kobayashi |
| 2020/0088982 | A1 | 3/2020 | Jin et al. |
| 2021/0011269 | A1 | 1/2021 | Maddox et al. |
| 2021/0033841 | A1 | 2/2021 | Maddox et al. |

FOREIGN PATENT DOCUMENTS

| | | |
|---|---|---|
| CN | 1902475 A | 1/2007 |
| CN | 103424859 A | 12/2013 |
| CN | 103424861 A | 12/2013 |
| CN | 103513411 A | 1/2014 |
| CN | 112020641 A | 12/2020 |
| DE | 10 2014 118 025 A1 | 6/2016 |
| EP | 4273594 A2 | 11/2023 |
| JP | 2002-506203 A | 2/2002 |
| JP | 2015-537236 A | 12/2015 |
| JP | 7265263 B2 | 4/2023 |
| WO | WO 97/12226 | 4/1997 |
| WO | WO 01/61324 A1 | 8/2001 |
| WO | WO 2015/155027 A1 | 10/2015 |
| WO | WO 2018/049306 A1 | 3/2018 |
| WO | WO 2019/178090 A1 | 9/2019 |
| WO | WO 2019/178093 A1 | 9/2019 |

OTHER PUBLICATIONS

European Search Report for European Patent Application Serial No. 23177473.8 (Dec. 8, 2023).

Notice of Allowance and Fee(s) Due for U.S. Appl. No. 16/980,225 (Dec. 27, 2021).

Notice of Allowance and Fee(s) Due for U.S. Appl. No. 16/980,231 (Oct. 20, 2021).

Office Action for Canadian Patent Application Serial No. 3,035,788 (Oct. 15, 2021).

Notice of Allowance and Fee(s) Due for U.S. Appl. No. 16/980,225 (Sep. 10, 2021).

Corrected Notice of Allowability for U.S. Appl. No. 16/328,710 (Jul. 27, 2021).

Decision for Rejection for Japanese Patent Application No. 2019-513848 (Jul. 6, 2021).

Notice of Allowance and Fee(s) Due for U.S. Appl. No. 16/328,710 (Apr. 19, 2021).

Office Action for Canadian Patent Application Serial No. 3,035,788 (Feb. 2, 2021).

First Office Action for Japanese Patent Application Serial No. 2019-513848 (Jan. 12, 2021).

Non-Final Office Action for U.S. Appl. No. 16/328,710 (Dec. 15, 2020).

Golub, I., et al., "Toward the optical "magic carpet": reducing the divergence of a light sheet below the diffraction limit," Optics Letters, vol. 40., No. 21, pp. 5121-5124 (Nov. 1, 2015).

Office Action for Canadian Application Serial No. 3,035,788 (Apr. 8, 2020).

Extended European Search Report for European Application Serial No. 17849706.1 (Apr. 7, 2020).

Notification of Transmittal of the International Search Report and the Written Opinion of the International Searching Authority, or the Declaration for International Application Serial No. PCT/US2019/021839 (Jun. 26, 2019).

Communication of European publication number and information on the application of Article 67(3) for European Application Serial No. 17849706.1 (May 29, 2019).

Notification of Transmittal of the International Search Report and the Written Opinion of the International Searching Authority, or the Declaration for International Application No. PCT/US2019/021842 (Mar. 12, 2019).

Fadero et al., "LITE microscopy: Tilted light-sheet excitation of model organisms offers high resolution and low photobleaching," Journal of Cell Biology, pp. 1-14 (Feb. 28, 2018).

International Search Report and Written Opinion of the International Searching Authority for International Application Serial No. PCT/US2017/050914 (Dec. 28, 2017).

Golub et al., "Toward the optical "magic carpet": reducing the divergence of a light sheet below the diffraction limit," Optics Letters, vol. 40, No. 21, pp. 5121-5124 (Nov. 1, 2015).

Chen et al., "Lattice light-sheet microscopy: Imaging molecules to embryos at high spatiotemporal resolution," Science, vol. 346, Issue 6208, 13 pages (Oct. 24, 2014).

Huisken et al., "Even fluorescence excitation by multidirectional selective plane illumination microscopy (mSPIM)," Optics Letters, vol. 32, No. 17, pp. 2608-2610 (Sep. 1, 2007).

Drechsler et al., "Confocal microscopy with a high numerical aperture parabolic mirror," Optics Express, vol. 9, No. 12, pp. 1-8 (Dec. 3, 2001).

Hell et al., "Confocal microscopy with an increased detection aperture: type-B 4Pi confocal microscopy," Optics Letters, vol. 19, No. 3, pp. 1-4 (Feb. 1, 1994).

(56) References Cited

OTHER PUBLICATIONS

Notice of Intent to Grant for European Patent Application No. 17849706.1 (Nov. 25, 2022).
Office Action for Japanese Patent Application Serial No. 2019-513848 (Nov. 29, 2022).
Office Action for Chinese Patent Application Serial No. 201980027377.7 (Sep. 21, 2023).
Decision to Grant for European Patent Application 17849706.1 (May 11, 2023).
Notice of Allowance and Fee(s) Due for Canadian Patent Application Serial No. 3,035,788 (Jul. 15, 2022).
Office Action for Chinese Patent Application Serial No. 201980027416.3 (Oct. 10, 2023).
Notice of Grant for Japanese Patent Application No. 2019-513848 (Mar. 14, 2023).
Office Action for Chinese Patent Application Serial No. 201980027416.3 (Mar. 25, 2024).
Notice of Allowance for Chinese Patent Application Serial No. 201980027416.3 (Jul. 2, 2024).

\* cited by examiner

Figure 5
Light "disc" illumination shadowing
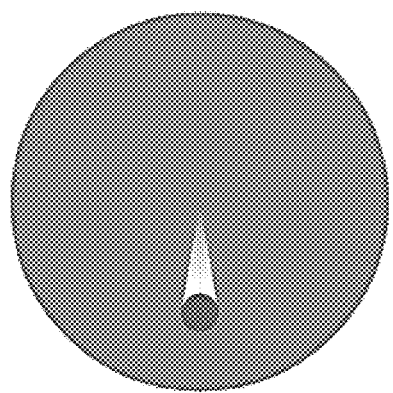
Disc
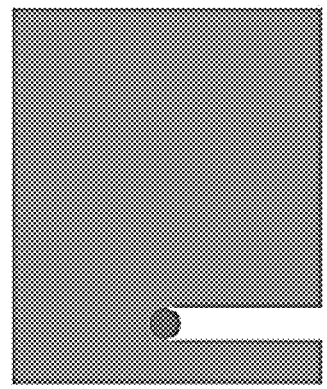
Sheet

LIGHT DISC MICROSCOPY FOR FLUORESCENCE MICROSCOPES

PRIORITY CLAIM

This application is a continuation-in-part of U.S. application Ser. No. 16/980,225, filed Sep. 11, 2020, which is a national stage application of PCT Application No. PCT/US2019/021839, filed on Mar. 12, 2019, which claims the benefit of U.S. Provisional Patent Application Ser. No. 62/641,598 filed Mar. 12, 2018. The disclosure of each of these applications is incorporated herein by reference in its entirety.

GOVERNMENT INTEREST

This invention was made with government support under Grant Number MCB-1652512 awarded by the National Science Foundation. The government has certain rights in the invention.

TECHNICAL FIELD

This specification relates generally to fluorescence microscopes and more particularly to light disc microscopy for fluorescence microscopes.

BACKGROUND

Light Sheet Fluorescence Microscopy (LSFM) has emerged as a powerful approach to restrict the excitation volume of fluorescence microscopy by forming a thin, pseudo-non-diffracting "sheet" of light. This sheet is typically thinner than the sample so that out-of-focus fluorescence is not generated and photobleaching is significantly reduced. With LSFM, cell biologists have been able to drastically extend the imaging lifetime for their living fluorescent organisms without introducing unnecessary photobleaching of fluorophores or phototoxicity of the sample.

One current obstacle in LSFM that limits the quality of the images generated (qualitative information) as well as the ability to quantify fluorescence signal with high accuracy (quantitative information) is the problem of "shadowing." This problem of shadowing comes from the optically inconsistent path that the excitation light must take through the sample. For example, if an optically dense structure absorbs, scatters, or refracts light from the light sheet, then structures that lie further down the path of light "behind" the first structure will experience less intense illumination than other nearby structures. This shadowing effect creates striping patterns along the sample that make quantifying fluorescence intensity in different stripes difficult.

Several solutions that mitigate the striping artifacts have been presented in the literature, such as rapidly dithering the sheet to taper shadows over a single exposure, using "self-healing" Bessel Beams that have naturally tapered shadows (1), or using multiple co-planar light sheets that stochastically illuminate each others' shadowed areas (2). Practical examples of the latter shadow correction technique include microscopes with two, four, and even six co-planar light sheets. The shadowing is reduced with the addition of each coplanar light sheet. The drawback to introducing more co-planar light sheets is that the alignment of multiple sheets becomes more complicated. Additionally, there is a practical limit to the number of light sheets that can be introduced with cylindrical lens-type objective elements, since each light sheet requires a separate lens.

SUMMARY

This specification describes a solution for introducing a theoretically infinite number of coplanar light sheets to reduce shadowing in LSFM to a theoretical minimum. This illumination scheme can be achieved with a single optical element (a paraboloidal mirror) rather than multiple independently positioned cylindrical lenses. In some examples, a method includes positioning the sample such that a plane of interest of the sample is coplanar with a focal plane of a detection objective of a microscope; positioning a mirror around the sample; directing a beam of annularly collimated excitation light on the mirror to focus a disc of light on the sample; and imaging the sample through the detection objective.

BRIEF DESCRIPTION OF THE DRAWINGS

FIG. 5 is a diagram illustrating light disc illumination shadowing; and

DESCRIPTION

This specification describes methods for imaging a sample using fluorescence microscopy, systems for imaging a sample using fluorescence microscopy, and illumination systems for fluorescence microscopes.

Figure 1:
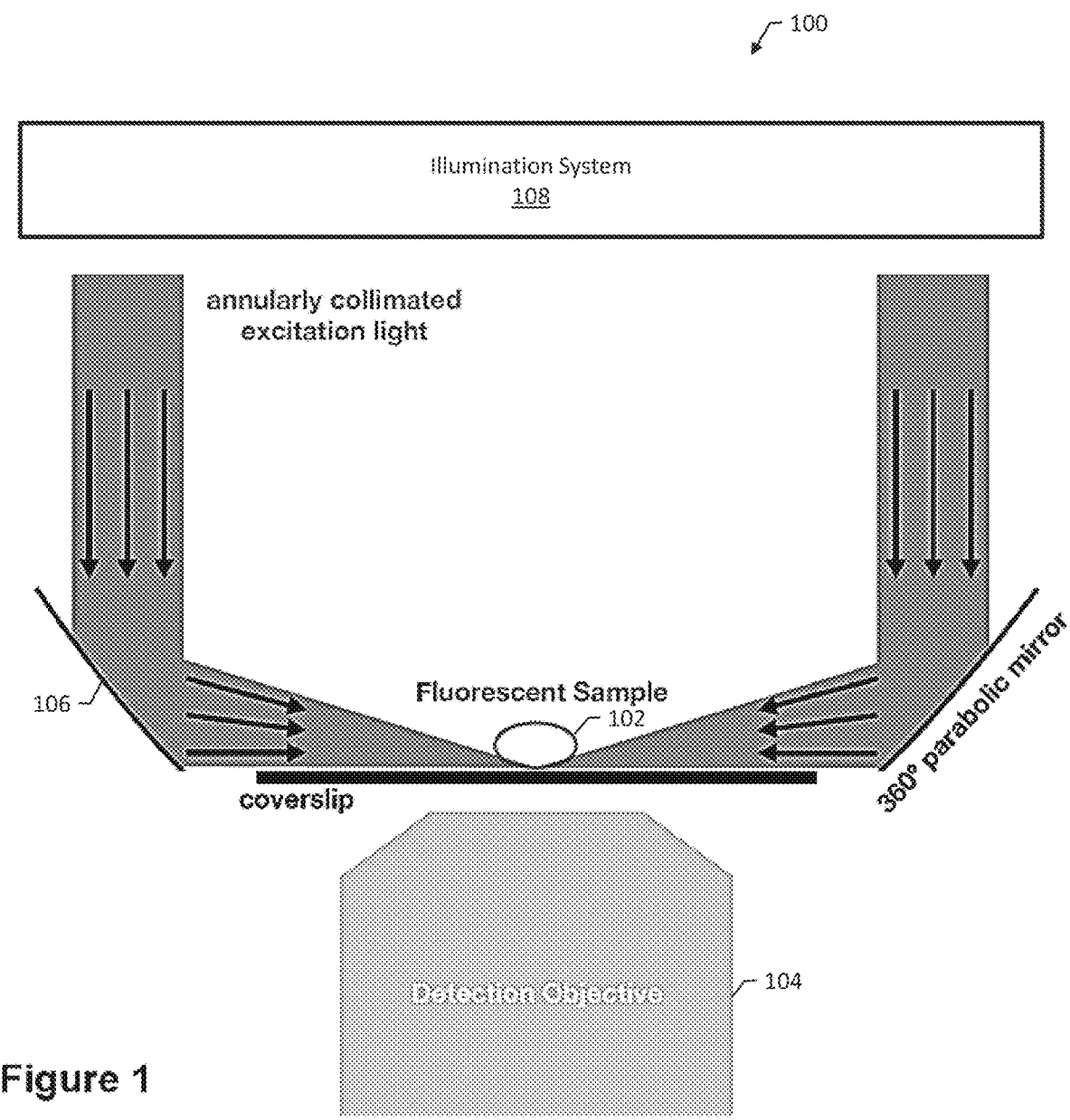
FIG. 1 is a diagram of an example system for imaging a sample using fluorescence microscopy.

FIG. 1 is a diagram of an example system 100 for imaging a sample 102 using fluorescence microscopy. System 100 includes a detection objective 104 of a microscope. Sample 102 is positioned, e.g., on a coverslip, such that a plane of interest of sample 102 is coplanar with a focal plane of detection objective 104. System 100 includes a paraboloidal mirror 106 oriented around sample 102 such that a focal point of paraboloidal mirror 106 is coplanar with the focal plane of detection objective 104 and the plane of interest of sample 102. System 100 includes an illumination system 108 configured for directing a beam of annularly collimated excitation light on paraboloidal mirror 106 to focus a disc of light on sample 102 and imaging sample 102 through detection objective 104.

FIG. 1 shows one potential arrangement in which a paraboloidal mirror can direct a beam of annularly collimated excitation light over a coverslip to focus to a diffraction-limited "sheet" in the fluorescent sample, which is then imaged by a detection objective. The curved nature of the paraboloidal mirror allows any collimated light parallel to its optical axis to focus to a point. The paraboloidal mirror should be positioned such that its focal point is coplanar with the detection objective focal plane. In order to view the sample, it should also be positioned such that the plane of interest is coplanar with the detection objective focal plane.

Figure 2:
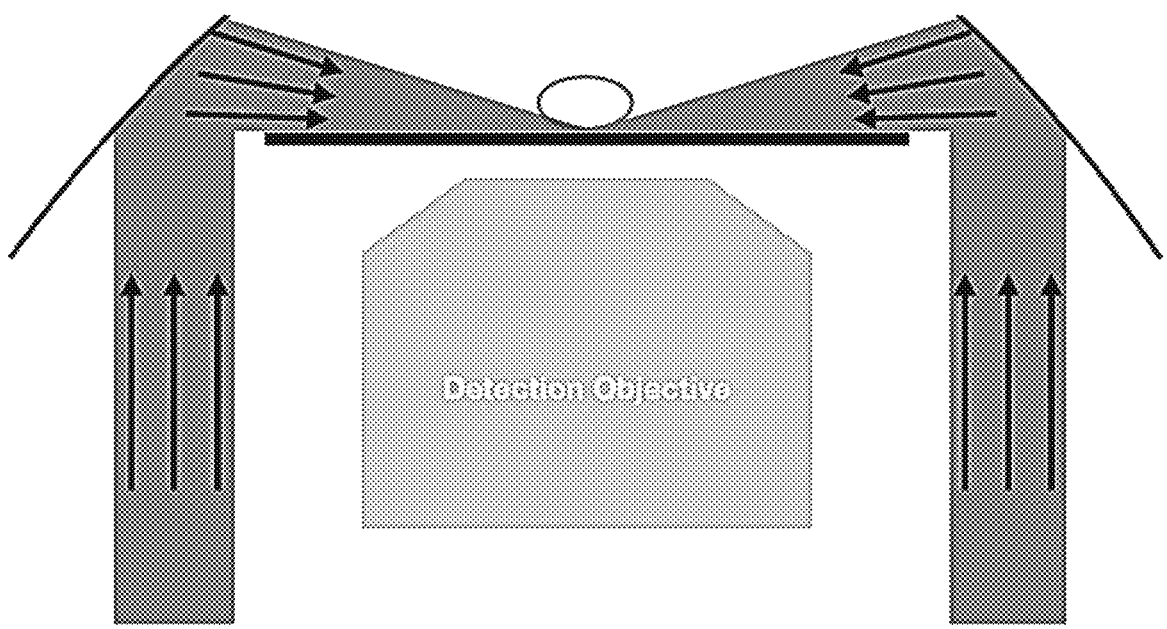
FIG. 2 is a diagram of an example system with a paraboloidal mirror mounted antiparallel to the detection objective.

In order to be compatible with detection objectives of a high numerical aperture (NA) that require coverslips, the excitation light must not intersect the glass coverslip before it reaches the sample. Accordingly, the annularly collimated excitation light must be focused such that the marginal ray closest to the coverslip travels parallel to the coverslip. This can be theoretically accomplished with a paraboloidal mirror mounted parallel to the detection objective (FIG. 1) or antiparallel to the detection objective (FIG. 2). FIG. 2 is a diagram of an example system with a paraboloidal mirror mounted antiparallel to the detection objective.

Effectively, every one of the infinite number of coplanar light sheets needs to be tilted relative to the detection objective focal plane. The calculations for the angle at which these sheets need to be tilted was first described by Fadero et al. in 2018 (3); this calculation can easily be applied to a paraboloidal-generated light sheet as well.

By changing the thickness of the annularly collimated excitation light, it is possible to adjust the effective tilt angle of the converging beam over the coverslip. For example, increasing the thickness of the collimated light will proportionally increase the convergence angle of the focused light, and vice-versa. This method of illumination cannot be performed at a tilt angle of 0° with an objective that requires a coverslip. Fadero et al. (2018) describe the spatial dimensions (length, width) and tilt angle for a light sheet that is optimized for any given detection objective (3). As long as the tilt angle for this setup is greater than or equal to this non-zero value described by Fadero et al. (3), this setup is compatible with any detection objective.

Figure 3:
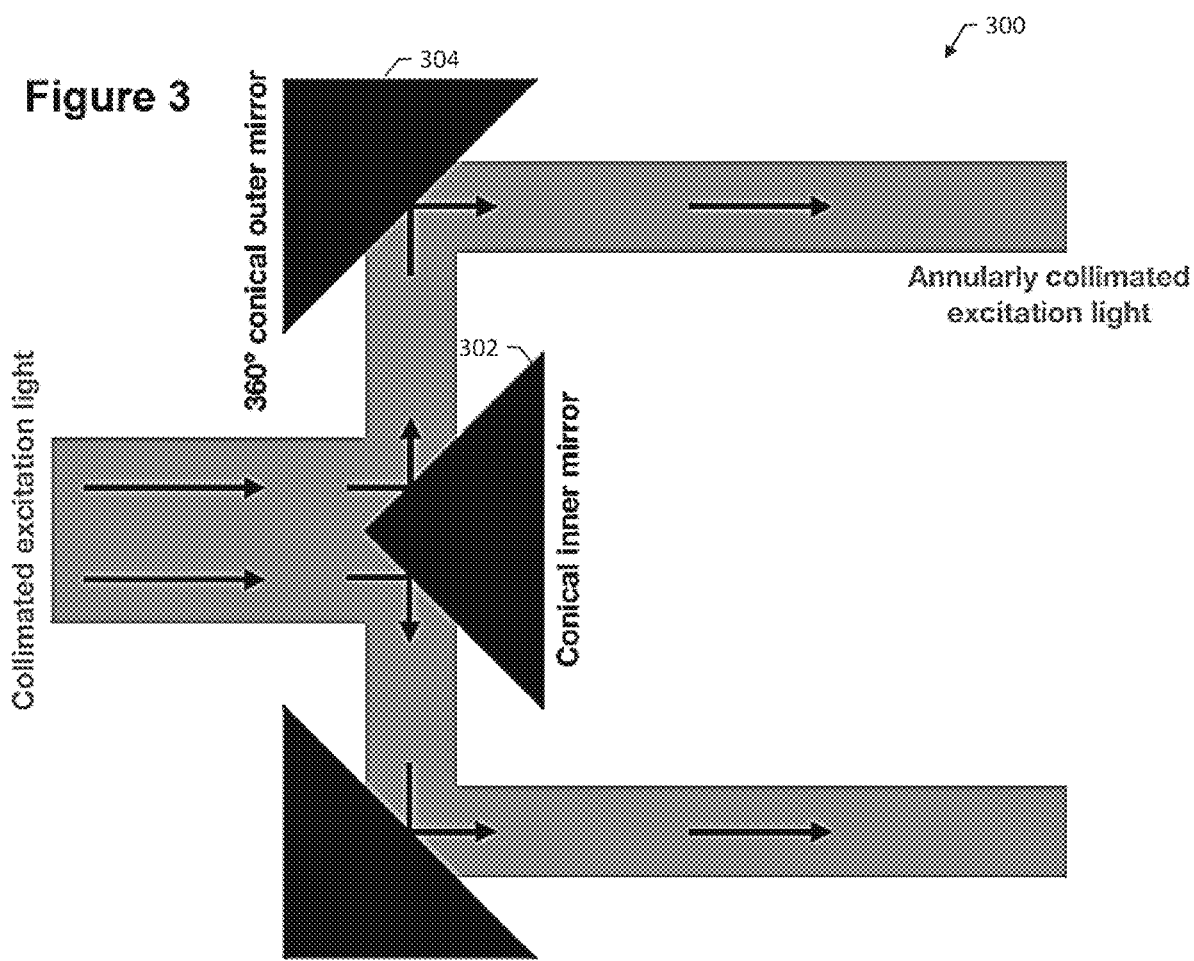
FIG. 3 is a diagram of an example illumination system for a fluorescence microscope.

In order to generate an annularly collimated beam efficiently, we propose using the technique described in FIG. 3 involving two conical mirrors.

FIG. 3 is a diagram of an example illumination system 300 for a fluorescence microscope. System 300 includes a conical inner mirror 302 and a conical outer mirror 304. Conical inner mirror 302 and conical outer mirror 304 can be used with a paraboloidal mirror (e.g., paraboloidal mirror 106 of FIG. 1) to image a sample. System 300 can include a structure, e.g., a motion stage or other appropriate apparatus, for positioning conical inner mirror 302 at a center of a collimated excitation beam so that excitation light is symmetrically reflected at every angle about conical inner mirror 302, and positioning conical outer mirror 304 to be centered around conical inner mirror 302 such that the excitation light that is symmetrically reflected from conical inner mirror 302 is reflected by conical outer mirror 304 into a beam of annularly collimated excitation light directed at the paraboloidal mirror. In some examples, the structure is configured for positioning the paraboloidal mirror around a sample such that a focal point of the paraboloidal mirror is coplanar with a focal plane of a detection objective of a microscope and a plane of interest of the sample.

The conical mirrors are symmetric about the excitation light propagation axis and act as non-focusing mirrors so that the light remains collimated. The conical inner mirror has a half-angle of 45° such that any collimated light incident upon it reflects at an angle of 90°. The conical inner mirror should be positioned at the center of the collimated excitation beam so that the light is symmetrically reflected at every angle. The light is then reflected a second time by a conical outer mirror centered about the conical inner mirror.

The outer mirror is a hollow cone of reflective material with a half angle of 45°. The inner and outer mirrors need not have half angles of precisely 45°; rather, the half angles of the conical mirrors should be complementary to each other (i.e. their sum is equal to 90°). The complementary angles ensure that the final annulus generated is not diverging. This annulus should then be incident upon the aforementioned paraboloidal focusing mirror.

Figure 4:
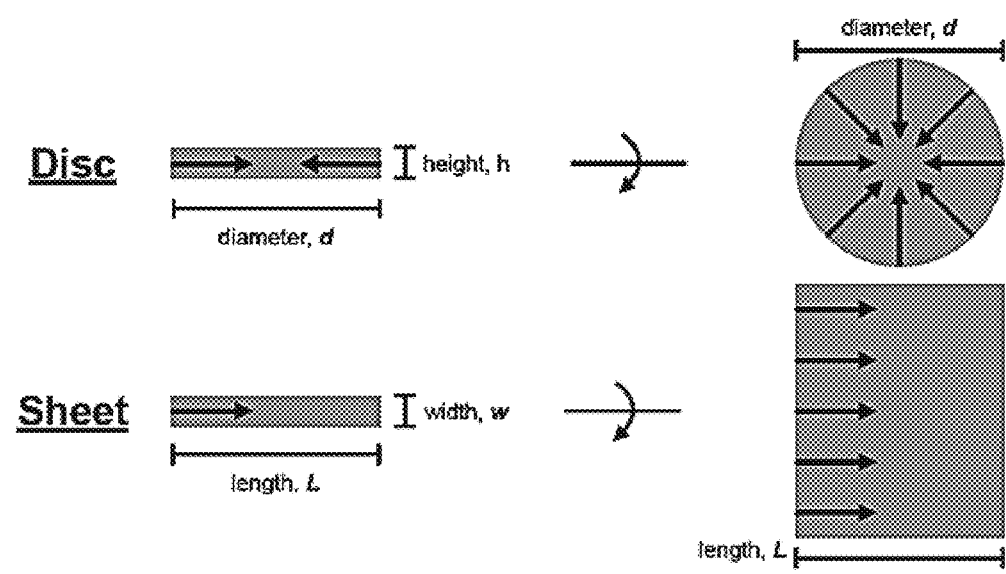
FIG. 4 is a diagram illustrating illumination by a thin "disc" of light.

FIG. 4 is a diagram illustrating illumination by a thin "disc" of light. The nature of the focused sheets from a focusing paraboloidal mirror theoretically forms a thin "disc" of light, rather than a thin sheet from a single focusing lens. This is because an infinite number of radially symmetric sheets focusing to the same point result in a diffraction-limited profile with a constant height (h) and a symmetric diameter (d), which are respectively analogous to the width (w) and length (L) of a light sheet. Side views of the disc and sheet are shown on the left of FIG. 4. From this angle, the disc and sheet are identical.

A rotated view into the plane of the page reveals that the lateral (X/Y) dimensions of the disc are different than those of the sheet, because all light converges to (and diverges from) the center. Because the converging light originated from a single coherent beam, the light will form a coherent disc shape at the focal point of the paraboloidal mirror, with dimensions (h and d) described by the same formulae outlined for light sheet dimensions in Fadero et al. (2018) (3).

FIG. 5 is a diagram illustrating light disc illumination shadowing. The disc will also have a minimum amount of shadowing, as shown by the optically dense objects in FIG. 5 that block light. This reduction in shadowing occurs because every point within the disc is illuminated equally from all horizontal angles. Previous LSFM systems can approximate this disc with a finite number of coplanar light sheets, but only with an infinite number of coplanar light sheets will a light disc form, with which shadowing can be reduced to its theoretical minimum.

This technology is broadly applicable to all users of fluorescence microscopy, as it is a form of LSFM compatible with any detection objective. It is of particular significance to live-cell fluorescence imaging, as the light disc can reduce out-of-focus fluorescence signal and reduce photobleaching/phototoxicity; however, the technology can be used on any appropriate type of samples, including fixed samples. It is even more applicable as a notable improvement to the current implementations of LSFM, as the minimal shadowing will maximize the quality of LSFM images as well as their quantitative information.

Figure 6:
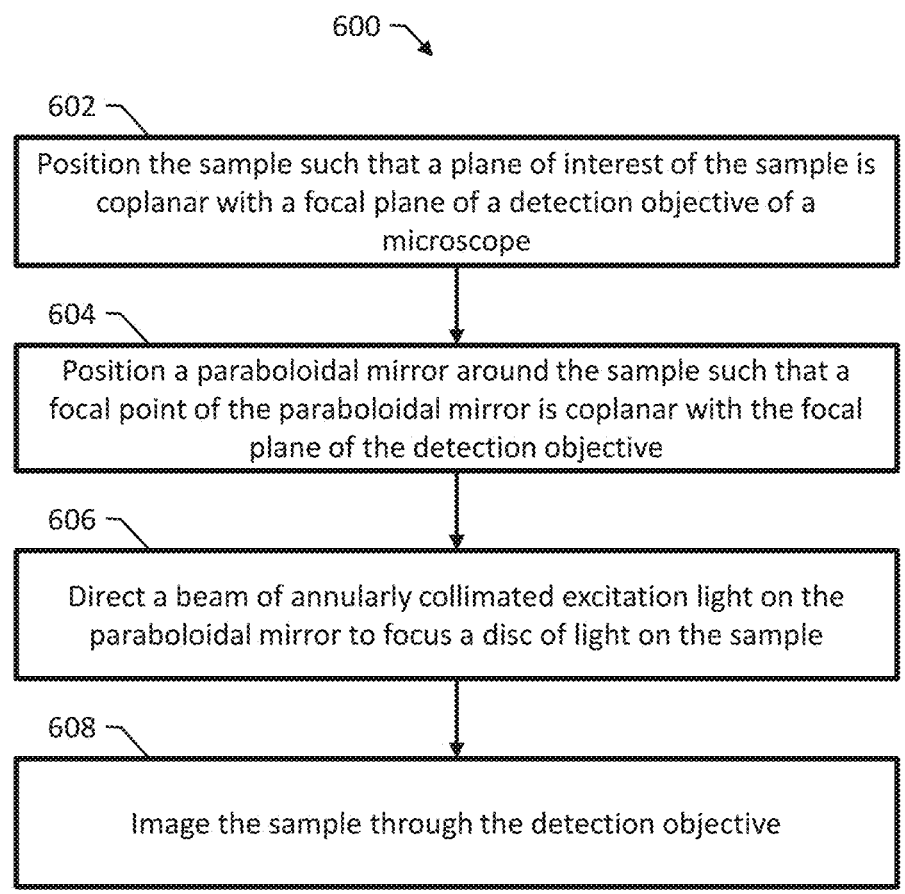
FIG. 6 is a flow diagram of a method for imaging a sample using fluorescence microscopy.

FIG. 6 is a flow diagram of a method 600 for imaging a sample using fluorescence microscopy. The method 600 includes positioning the sample such that a plane of interest of the sample is coplanar with a focal plane of a detection objective of a microscope (602). The method 600 includes positioning a paraboloidal mirror around the sample such that a focal point of the paraboloidal mirror is coplanar with the focal plane of the detection objective and the plane of interest of the sample, e.g., as described above with reference to FIGS. 1-2 (604). The method 600 includes directing a beam of annularly collimated excitation light on the paraboloidal mirror to focus a disc of light on the sample, e.g., as described above with reference to FIG. 3 (606). The method 600 includes imaging the sample through the detection objective (608).

Figure 7:
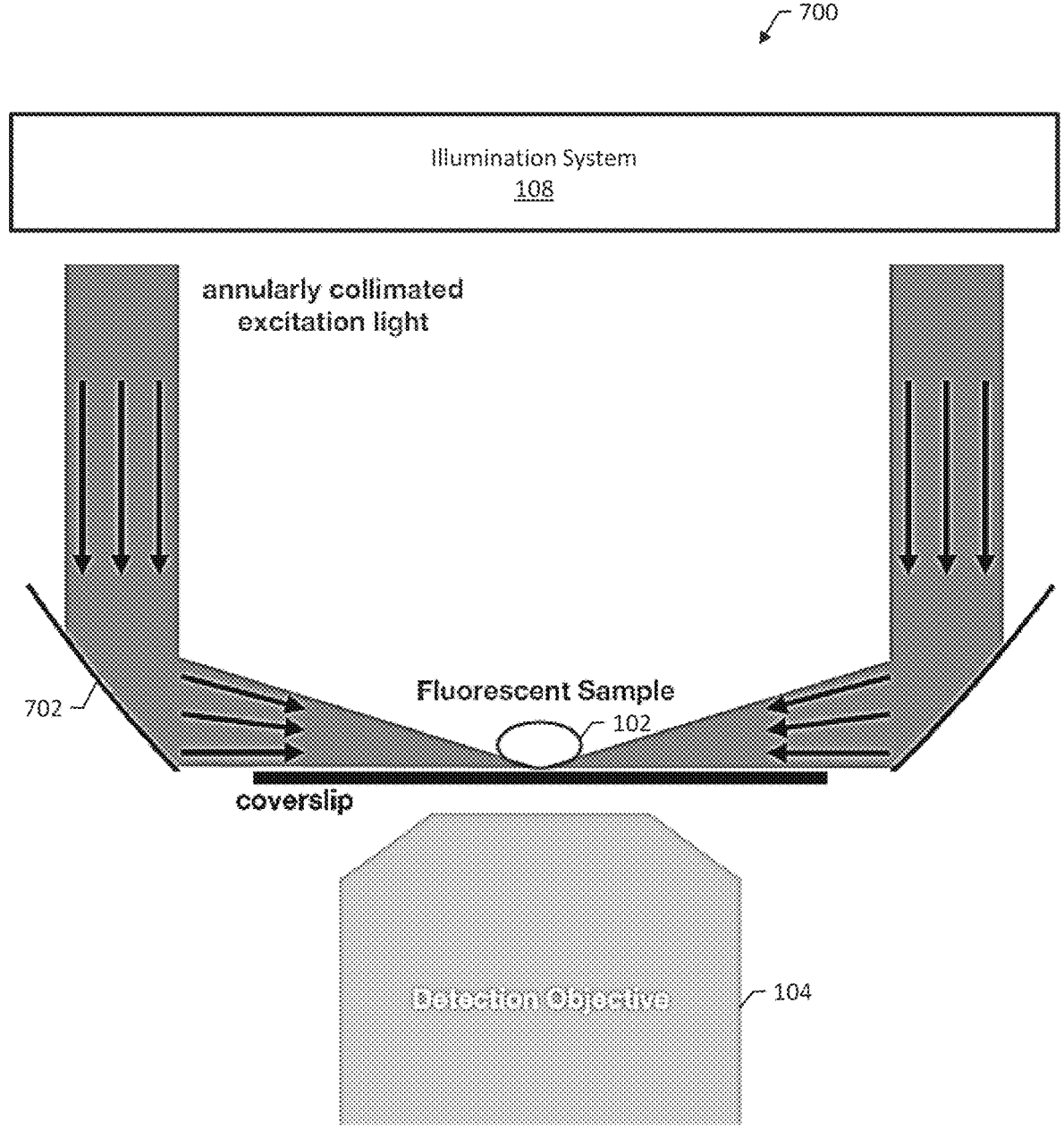
FIG. 7 is a diagram of an example system for imaging a sample using fluorescence microscopy.

FIG. 7 is a diagram of an example system 700 for imaging a sample 102 using fluorescence microscopy. System 700 includes a detection objective 104 of a microscope. Sample 102 is positioned, e.g., on a coverslip, such that a plane of interest of sample 102 is coplanar with a focal plane of detection objective 104. System 700 includes a mirror 702 oriented around sample 102. System 700 includes an illumination system 108 configured for directing a beam of annularly collimated excitation light on mirror 702 to focus a disc of light on sample 102 and imaging sample 102 through detection objective 104.

Mirror 702 can have a paraboloidal shape, as described above with reference to FIG. 1, or mirror 702 can have another conical shape. In general, mirror 702 can have any appropriate shape for focusing a disc of light or an approximated disc of light on sample 102. For example, mirror 702 can have an ellipsoid or hyperboloid shape or a shape of another conic section.

A paraboloid is a parabola rotated on one axis. A hyperboloid and ellipsoid are created in the same way, i.e., by rotating the parent shape on one axis. Paraboloids are widely used shapes because they can focus parallel rays to a single point. However, it may be useful for system 700 to have some light rays slightly out of focus. For example, a hyperboloid shape that is almost a perfect paraboloid shape may be appropriate.

Mirror 702 can be, e.g., an ellipsoid with two focal points, or an elliptical paraboloid. A regular paraboloid can be made by rotation on an axis. A different shape can be made by performing an elliptical rotation instead of a circular rotation. The resulting shape may have desirable effects for system 700, as it would lead to some light being well focused and other rays drifting away from the focus point.

The curved nature of mirror 702 allows any collimated light parallel to its optical axis to focus to a point. Mirror 702 can be positioned such that its focal point is coplanar with the detection objective focal plane and such that the plane of interest is coplanar with the detection objective focal plane.

The annularly collimated excitation light can be focused such that the marginal ray closest to the coverslip travels parallel to the coverslip. This can be accomplished by mounting mirror 702 parallel to the detection objective (FIG. 7) or antiparallel to the detection objective (FIG. 2). Effectively, each of the coplanar light sheets is thereby tilted relative to the detection objective focal plane. By changing the thickness of the annularly collimated excitation light, it is possible to adjust the effective tilt angle of the converging beam over the coverslip.

Figure 8:
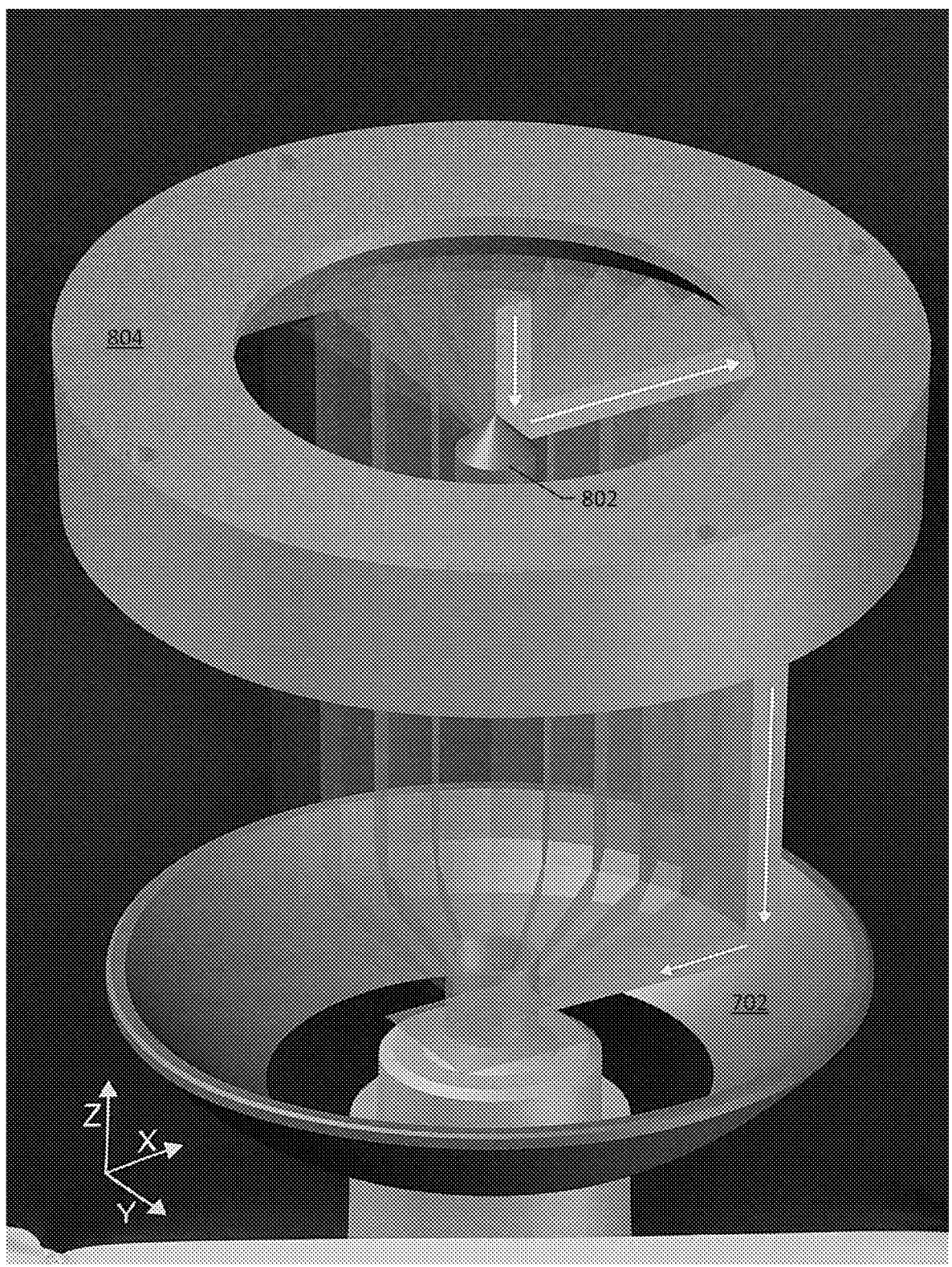
FIG. 8 is a schematic diagram of a light path for imaging a sample using fluorescence microscopy.

FIG. 8 is a schematic diagram of a light path for imaging a sample using fluorescence microscopy. Light enters from the top and reflects off of mirror 802, which is cone shaped. The light then reflects off mirror 804, which is shaped as the inside of a cone. The light goes down onto the onto mirror 702, which can be, e.g., a paraboloid, ellipsoid, hyperboloid, or other appropriate shape with a conic section.

The light path can include other optical elements at different places in the light path for various purposes. For example, an optical element can be added before the light hits mirror 802. An example of an optical element is a photomask, which allows some light to pass through and block some other light in a particular pattern. In some cases, it may be useful to have multiple photomasks, or to include a photomask with other optical elements in the light path. Other optical elements can include: a photomask, a raster/galvo mirror, a scanning lens, or a spinning disk.

In general, optical elements can be static or rotating. For example, the system can include one or more motors, as appropriate, coupled to the optical elements to cause them to rotate.

Figure 9:
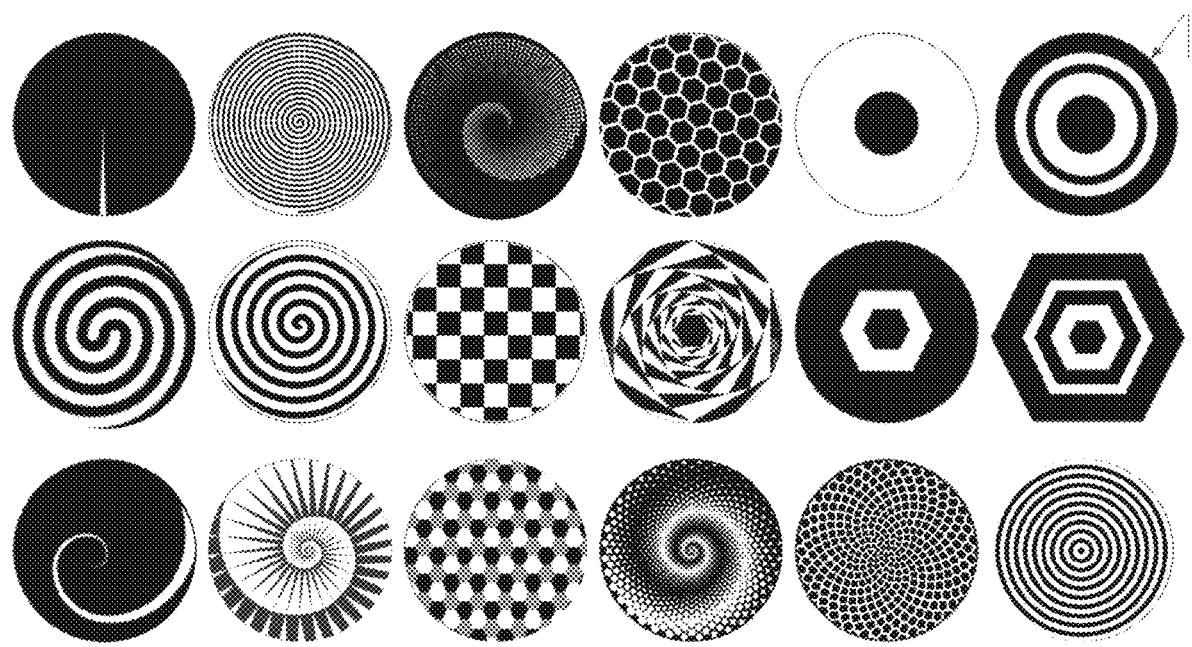
FIG. 9 shows examples of photomasks.

FIG. 9 shows examples of photomasks. In the example photomasks, dark areas block light and light areas allow light to pass.

Photomasks such as those shown in FIG. 9 can be used to create one or more desirable effects. Generally, the photomasks allow only some light at any given time to pass through and reach mirror 702, so that too much light will not build up in the middle focus point. More specifically, the photomasks can be used for structured illumination microscopy, for instance by creating Moiré patterns or other appropriate interference patterns for, e.g., pseudo non-diffracting propagation. A photomask could alternatively be printed on mirror 802 or mirror 804, or in the light path after mirror 802 or mirror 804.

Other examples of optical elements are mirrors or lenses to shape the light, e.g., before it reaches mirror 802 or after mirror 802 or after mirror 804. These other optical elements can be configured as static elements or rotating elements.

Referring to FIG. 7, system 700 can be configured to use adaptive optics to change the shapes of mirrors (e.g., one or more of mirrors 802, 804, and 702). Adaptive optics (AO) is a technology used to improve the performance of optical systems by, e.g., reducing the effect of incoming distortions by deforming a mirror in order to compensate for the distortion. An example of adaptive optics is tip-tilt correction, which can include correction of the tilts of the wavefront in two dimensions. This can be implemented, for example, using a rapidly moving tip-tilt mirror that makes small rotations around two of its axes. Some tip-tilt mirrors are segmented mirrors having only one segment which can tip and tilt, and some tip-tilt mirrors have an array of multiple segments that can tip and tilt independently.

Mirror 702 (or other mirrors such as mirror 802 and mirror 8040 may be controlled by AO. Controlling or manipulating optical elements with AO is used in many applications and can enable subtle changes to optical elements extremely rapidly, e.g., as controlled by electric forces.

For example, AO can be used to control mirror 702, to make mirror 702 slightly oblong along one axis and then rapidly make it oblong on the perpendicular axis. Or, instead of just two axes, AO can be used control mirror 702 to make it slightly oblong along, e.g., 6, 8, 12 or any appropriate number of axes in any number of patterns. In addition to making mirror 702 slightly oblong, AO can be used to control mirror 702 to make it slightly compressed along the vertical axis, either across the whole mirror or at different sections of the mirror.

Placing other optical elements in the light path, and/or using AO to control one or more mirrors, can be used to create structured illumination for super-resolution. Creating structured illumination patterns can include creating Moiré patterns or other interference patterns to create beams with useful properties such as self-healing or quasi-non-diffraction.

Structured Illumination Microscopy (SIM) is a super-resolution fluorescence optical microscope imaging technique that increases resolution by exploiting interference patterns (e.g., Moiré patterns) created when two grids are overlaid at an angle. SIM is based on the excitation of the sample with a known spatially structured pattern of light. Typically, a periodic grating is projected onto the image plane of the microscope and frequency mixing occurs. This frequency mixing can improve resolution if several images are acquired with shifted illumination patterns. The resulting images are similar to Moiré images. In Moiré pattern generation, a mask consisting of high frequency lines is superimposed on an image, which also contains fine features. This produces an image where the fine features are encoded in slowly varying (low frequency) patterns.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

The disclosure of each of the following references is hereby incorporated by reference in its entirety.
1. Chen, B. C., W. R. Legant, K. Wang, L. Shao, D. E. Milkie, M. W. Davidson, C. Janetopoulos, X. S. Wu, J. A. Hammer III, Z. Liu, et al. 2014. Lattice light-sheet microscopy: Imaging molecules to embryos at high spatiotemporal resolution. Science. 346:1257998. doi: 10.1126/science.1257998
2. Huisken, J. and Stainier, D. Y. R. 2007. Even fluorescence excitation by multidirectional selective plane illumination microscopy (mSPIM). Optics Lett. 32 (17), 2608-2610.
3. Fadero, T. C., Gerbich, T. M., Rana, K., Suzuki, A., DiSalvo, M., Schaefer, K. N., Heppert, J. K., Boothby, T. C., Goldstein, B., Peifer, M., Allbritton, N. L., Gladfelter, A. S., Maddox, A. S., and Maddox, P. S. 2018. LITE microscopy: Tilted light-sheet excitation of model organisms offers high resolution and low photobleaching. Journ. Cell Biol. DOI: 10.1083/jcb.201710087

What is claimed is:

1. A method for imaging a sample using fluorescence microscopy, the method comprising:
   positioning the sample such that a plane of interest of the sample is coplanar with a focal plane of a detection objective of a microscope;
   positioning a mirror around the sample;
   directing a beam of annularly collimated excitation light on the mirror to focus a disc of light on the sample, wherein directing the beam of annularly collimated excitation light comprises directing a collimated excitation beam onto a conical inner mirror positioned at a center of the collimated excitation beam so that excitation light is symmetrically reflected at every angle about the conical inner mirror; and
   imaging the sample through the detection objective.

2. The method of claim 1, wherein the mirror has an ellipsoid shape, a hyperboloid shape, or an elliptical paraboloid shape.

3. The method of claim 1, comprising positioning an optical element in a light path of the beam of annularly collimated excitation light.

4. The method of claim 3, wherein the optical element comprises one or more of: a photomask, a raster/galvo mirror, a scanning lens, or a spinning disk.

5. The method of claim 1, comprising controlling the mirror using adaptive optics.

6. The method of claim 1, comprising positioning at least one optical element and/or controlling the mirror using adaptive optics to create structured illumination for super-resolution.

7. The method of claim 1 wherein directing the beam of annularly collimated excitation light comprises setting a thickness of the beam of annularly collimated excitation light such that a propagation axis of each coplanar light sheet reflected by the paraboloidal mirror is at an oblique angle relative to the focal plane of the detection objective.

8. The method of claim 1, wherein positioning the mirror comprises mounting the mirror parallel or antiparallel to the detection objective.

9. The method of claim 1, wherein imaging the sample comprises performing live-cell fluorescence imaging.

10. A system for imaging a sample using fluorescence microscopy, the system comprising:
    a detection objective of a microscope and a sample positioned such that a plane of interest of the sample is coplanar with a focal plane of the detection objective;
    a mirror oriented around the sample;
    an illumination system configured for directing a beam of annularly collimated excitation light on the mirror to focus a disc of light on the sample and imaging the sample through the detection objective; and
    a controller coupled to the mirror and configured for controlling the mirror using adaptive optics.

11. The system of claim 10, wherein the mirror has an ellipsoid shape, a hyperboloid shape, or an elliptical paraboloid shape.

12. The system of claim 10, comprising an optical element in a light path of the beam of annularly collimated excitation light.

13. The system of claim 12, wherein the optical element comprises one or more of: a photomask, a raster/galvo mirror, a scanning lens, or a spinning disk.

14. The system of claim 10, wherein the illumination system is configured for creating structured illumination for super-resolution using at least one optical element and/or a controller for controlling the mirror using adaptive optics.

15. The system of claim 10, wherein directing the beam of annularly collimated excitation light comprises setting a thickness of the beam of annularly collimated excitation light such that a propagation axis of each coplanar light sheet reflected by the paraboloidal mirror is at an oblique angle relative to the focal plane of the detection objective.

16. The system of claim 10, wherein directing the beam of annularly collimated excitation light comprises directing a collimated excitation beam onto a conical inner mirror positioned at a center of the collimated excitation beam so that excitation light is symmetrically reflected at every angle about the conical inner mirror.

17. The system of claim 10, wherein the mirror is mounted parallel or antiparallel to the detection objective.

18. The system of claim 10, wherein imaging the sample comprises performing live-cell fluorescence imaging.

* * * * *